(12) United States Patent
Lopez (10) Patent No.: US 11,346,491 B2
(45) Date of Patent: May 31, 2022

(54) SECURING DEVICE

(71) Applicant: Airbus Operations S.A.S., Toulouse (FR)

(72) Inventor: José Lopez, Bellesserre (FR)

(73) Assignee: Airbus Operations S.A.S.

( * ) Notice: Subject to any disclaimer, the term of this patent is extended or adjusted under 35 U.S.C. 154(b) by 168 days.

(21) Appl. No.: 16/199,669

(22) Filed: Nov. 26, 2018

(65) Prior Publication Data

US 2019/0186676 A1     Jun. 20, 2019

(30) Foreign Application Priority Data

Dec. 20, 2017    (FR) ..................................... 17 62568

(51) Int. Cl.
| | |
|---|---|
| *F16L 59/135* | (2006.01) |
| *F16L 59/18* | (2006.01) |
| *F16L 59/14* | (2006.01) |
| *F16L 3/237* | (2006.01) |
| *F16L 3/10* | (2006.01) |
| *F16L 59/20* | (2006.01) |
| *F16L 3/20* | (2006.01) |
| *F16L 59/12* | (2006.01) |
| *F24F 13/02* | (2006.01) |
| *F16L 3/26* | (2006.01) |

(52) U.S. Cl.
CPC ............ *F16L 59/135* (2013.01); *F16L 3/1025* (2013.01); *F16L 3/20* (2013.01); *F16L 3/237* (2013.01); *F16L 59/12* (2013.01); *F16L 59/14* (2013.01); *F16L 59/18* (2013.01); *F16L 59/20* (2013.01); *F16L 3/26* (2013.01); *F24F 13/0209* (2013.01); *F24F 13/0263* (2013.01)

(58) Field of Classification Search
CPC ..... F16L 5/135; F16L 3/10; F16L 3/20; F16L 3/22; F16L 3/237; F16L 3/1025; F16L 3/08; F16L 59/135; F16L 21/06
See application file for complete search history.

(56) References Cited

U.S. PATENT DOCUMENTS

| | | | |
|---|---|---|---|
| 4,465,252 A | 8/1984 | Donovan, Jr. et al. | |
| 4,560,188 A | 12/1985 | Berti et al. | |
| 5,261,633 A | * 11/1993 | Mastro ...................... | F16L 3/18 |
| | | | 248/68.1 |
| 5,620,210 A | 4/1997 | Eyster et al. | |
| 6,315,006 B1 | 11/2001 | Opperthauser | |

(Continued)

FOREIGN PATENT DOCUMENTS

| | | |
|---|---|---|
| EP | 2 476 942 A1 | 7/2012 |
| EP | 2881644 A1 | 6/2015 |
| WO | 2012/092650 A1 | 7/2012 |

*Primary Examiner* — Matheew Troutman
*Assistant Examiner* — Alexander T Rufrano
(74) *Attorney, Agent, or Firm* — Lerner, David, Littenberg, Krummholz & Mentlik, LLP (57) ABSTRACT

A securing device includes at least one rigid ring configured to encircle the pipe, and at least one securing system, rigid and distinct from the ring, including a body which has a first contact face configured to be pressed firmly against and secured to a surface of a structure, and at least one groove in which the ring is housed, the groove being configured to allow the securing system to slide with respect to the ring in a direction of sliding along the ring, while being immobile or near-immobile relative to the ring in a plane perpendicular to the direction of sliding.

6 Claims, 4 Drawing Sheets

(56) References Cited

U.S. PATENT DOCUMENTS

| | | |
|---|---|---|
| 7,350,834 B2 | 4/2008 | Ryhman et al. |
| 9,534,706 B2 * | 1/2017 | Larsson ................ F16L 3/1075 |
| 2002/0033604 A1 | 3/2002 | Minemyer |
| 2006/0255592 A1 | 11/2006 | Minemyer et al. |
| 2015/0316178 A1 | 11/2015 | Patil et al. |

* cited by examiner

SECURING DEVICE

FIELD OF THE INVENTION

The present application relates to a device for securing a pipe.

BACKGROUND OF THE INVENTION

An aircraft comprises numerous pipes which are connected to the structure of the aircraft by securing devices.

According to a first embodiment, a securing device comprises a collar configured to encircle the pipe and a mounting plate which has a contact surface configured to be pressed firmly against and secured to a surface of the structure of the aircraft (or to an element attached to the structure of the aircraft).

According to this first embodiment, the collar and the mounting plate form just one single same component.

This first embodiment is unsatisfactory because when the collar is assembled on the pipe, it is difficult to be able to firmly press the contact surface of the mounting plate flat against the surface of the structure (or the element attached to the structure).

According to a second embodiment, a securing device comprises a first part, in the form of a base which has an orifice and a contact surface pressed firmly against and secured to the surface of the structure of the aircraft (or to an element attached to the structure of the aircraft), and a second part in the form of a clamping collar which surrounds the pipe and passes through the orifice in the base.

Because of the flexibility of the clamping collar and of the clearance between the clamping collar and the orifice in the base, the connection between the collar and the base allows a certain latitude for movement, making it possible to be able to firmly press the contact surface of the base flat against the surface of the structure of the aircraft (or that of the element attached to the structure of the aircraft). However, this second embodiment is not entirely satisfactory because the securing device does not allow the pipe to be held in a given position with respect to the structure of the aircraft because of the compliance in the connection between the base and the clamping collar.

BRIEF SUMMARY OF THE INVENTION

Aspects of the present invention may remedy the drawbacks of the prior art.

An embodiment of the invention is a device for securing a pipe to a structure, this securing device comprising:
  at least one ring configured to encircle the pipe in such a way that the ring and the pipe are immobile or near-immobile relative to one another in a plane transverse to the pipe when the ring is assembled on the pipe, and
  at least one securing system comprising a body which has a first contact face configured to be pressed firmly against and secured to a surface of the structure.

According to an embodiment of the invention, the securing system and the ring are distinct and rigid and the securing system comprises at least one groove in which the ring is housed, the said groove being configured to allow the securing system to slide with respect to the ring in a direction of sliding along the ring, the securing system and the ring being immobile or near-immobile relative to one another in a plane perpendicular to the direction of sliding.

This securing device allows the pipe to be held in a given position with respect to the structure while at the same time making it possible for the contact face of the securing system to be able to be firmly pressed properly flat against the surface of the structure thanks to the connection between the securing system and the ring.

According to another feature, the groove is positioned on a second face of the body and extends between third and fourth end faces substantially perpendicular to the direction of sliding, the groove and the direction of sliding being curved and having the same radius of curvature as the ring.

According to another feature, the securing device comprises a bonded connection which connects the securing system and the ring.

According to one embodiment, the groove comprises a bottom facing the outside face of the ring, the said bottom comprising at least one crevice to house an adhesive substance. The body may comprise at least one conduit which has a first end opening onto the bottom of the groove, more particularly into at least one of the crevices, and a second end opening outside the groove, the said conduit being configured to convey the adhesive substance towards the bottom of the groove.

According to one configuration, the body comprises fifth and sixth lateral faces which are cut away in such a way that the first, second, third and fourth faces are connected by a web parallel to the direction of sliding.

According to a first embodiment, the ring is made in two parts which are configured to be assembled with one another.

According to a second embodiment, the body of the securing system comprises a first jaw and a second jaw which delimit the groove and which are configured to slide relative to one another in order to adjust the size of the groove.

The securing system may comprise a tie for connecting the first and second jaws and keeping them clamped onto the ring.

According to one application, the securing device comprises a retaining device for holding insulation on the pipe, and which comprises:
  an inner ring, configured to fit onto the pipe, which has an inside diameter substantially equal to the outside diameter of the pipe,
  an outer ring, coaxial with the inner ring, on which the securing system is assembled,
  a transverse web connecting the inner and outer rings,
  the inner and outer rings and the web being arranged in such a way that the retaining device has an I-section in a longitudinal plane.

BRIEF DESCRIPTION OF THE DRAWINGS

Other features and advantages will emerge from the following description of the invention, which description is given solely by way of example, with reference to the appended drawings in which.

DETAILED DESCRIPTION

Figure 1:
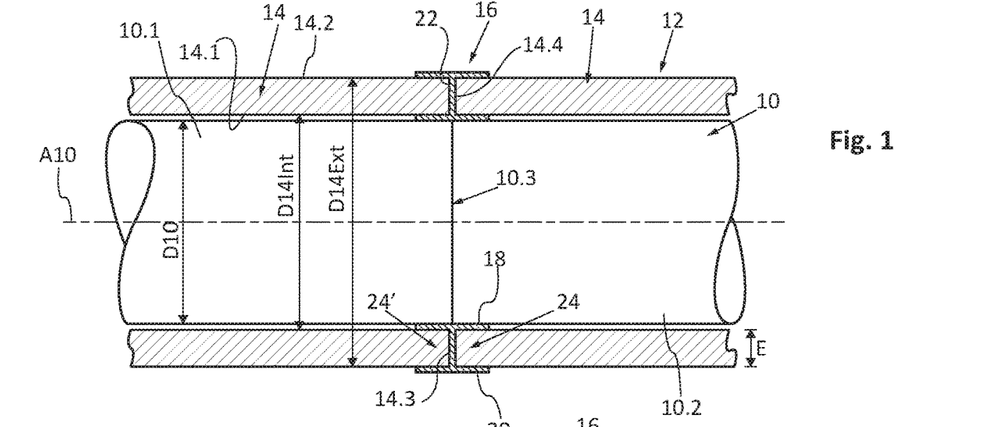
FIG. 1 is a longitudinal section through a pipe equipped with a retaining device for holding at least one piece of insulation, illustrating one embodiment of the invention.
Figures 2, 3, 4:
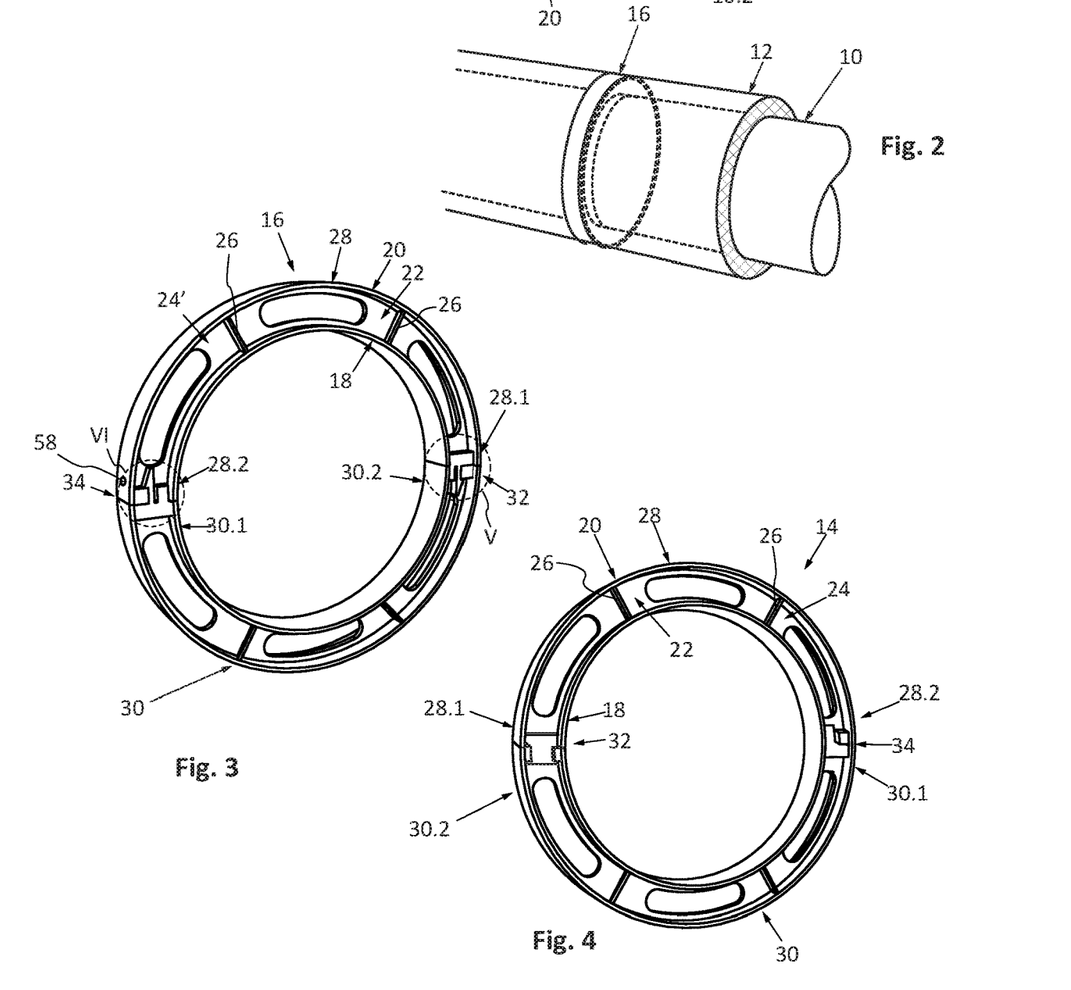
FIG. 2 is a perspective view of a pipe equipped with insulation retaining devices, illustrating one embodiment of the invention.
FIG. 3 is a view of a first face of a retaining device, illustrating one first embodiment of the invention.
FIG. 4 is a view of a second face of the retaining device visible in FIG. 3.
Figure 5:
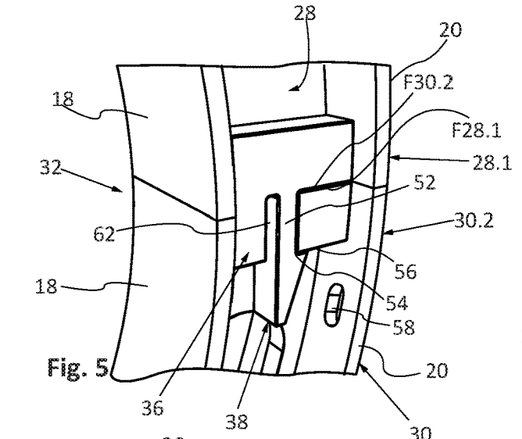
FIG. 5 is a detail view of zone V in FIG. 3, illustrating a connection between two parts of the retaining device visible in FIG. 3.
Figure 6:
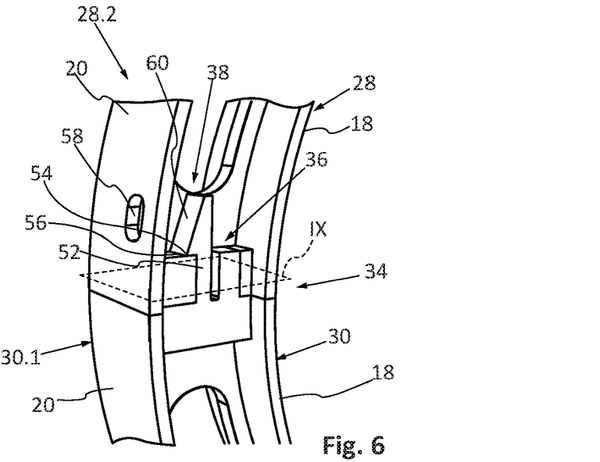
FIG. 6 is a detail view, illustrating a connection between two parts of the retaining device visible in FIG. 3.
Figure 7:
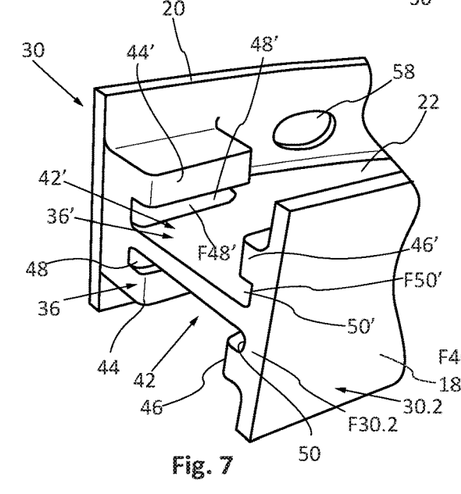
FIG. 7 is a perspective view of a first end of a first part of the retaining device visible in FIG. 3, in the unassembled state.
Figure 8:
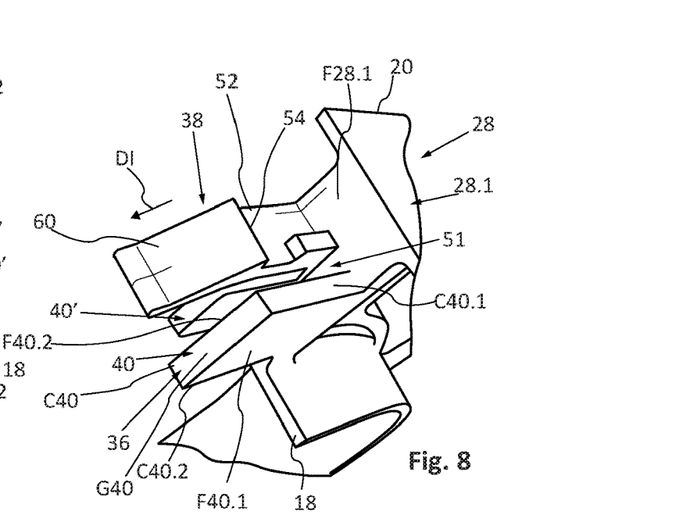
FIG. 8 is a perspective view of a second end of the first part of the retaining device visible in FIG. 3, in the unassembled state.
Figure 9:
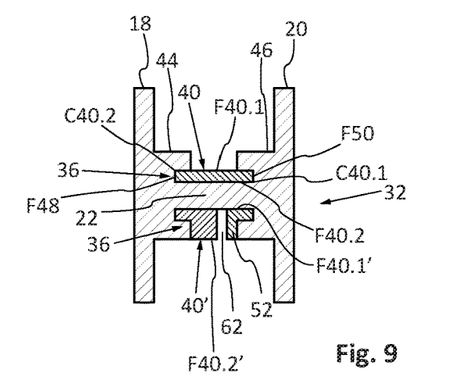
FIG. 9 is a view in section on plane IX of FIG. 6.

FIGS. 1 and 2 depict a pipe 10 made up, by way of example, of several sections 10.1 and 10.2 butted together end to end at a junction zone 10.3 The pipe 10 has an outside diameter D10.

The pipe 10 has an axis A10. For the remainder of the description, a longitudinal direction is parallel to the axis A10 of the pipe 10. A transverse plane is perpendicular to the axis A10. A longitudinal plane contains the axis A10 of the pipe 10.

According to one embodiment, the pipe 10 is equipped with tubular insulation 12, which surrounds the pipe 10 and which comprises several tubes 14 butted together end to end. Each tube 14 comprises an inside face 14.1 with an inside diameter D14int which is greater than or equal to the outside diameter D10 of the pipe 10, an outside face 14.2 with an outside diameter D14ext, a first end face 14.3 and a second end face 14.4. According to a first embodiment, each tube 14 is split so that it can be fitted around the pipe 10. According to a second embodiment, each tube 14 comprises two half-tubes.

When the insulation 12 is fitted around the pipe 10, the inside and outside faces 14.1, 14.2 are approximately coaxial with the axis A10 of the pipe 10 and the first and second end faces 14.3, 14.4 are positioned in transverse planes. Each end face 14.3, 14.4 has a thickness E which corresponds to the distance separating the inside and outside faces 14.1, 14.2 in a direction perpendicular to the axis A10 of the pipe 10.

Figure 13:
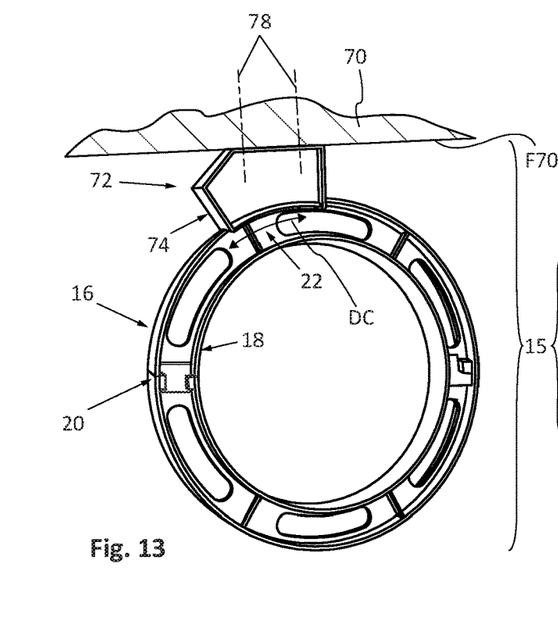
FIG. 13 is a perspective view of a securing device, illustrating a first embodiment also visible in FIG. 11.
Figure 14:
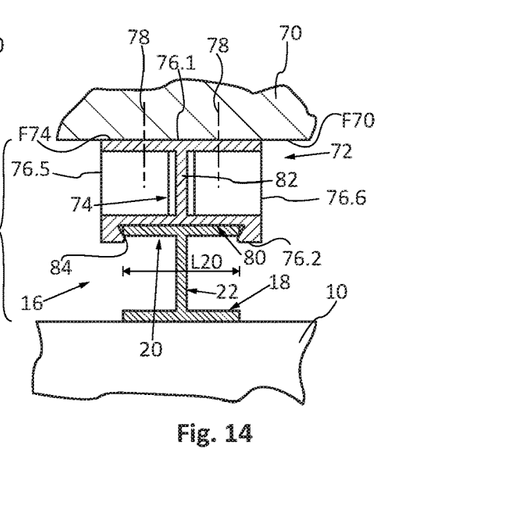
FIG. 14 is a longitudinal section through the securing device visible in FIG. 13.
Figures 15, 16, 17, 18, 19, 20, 21:
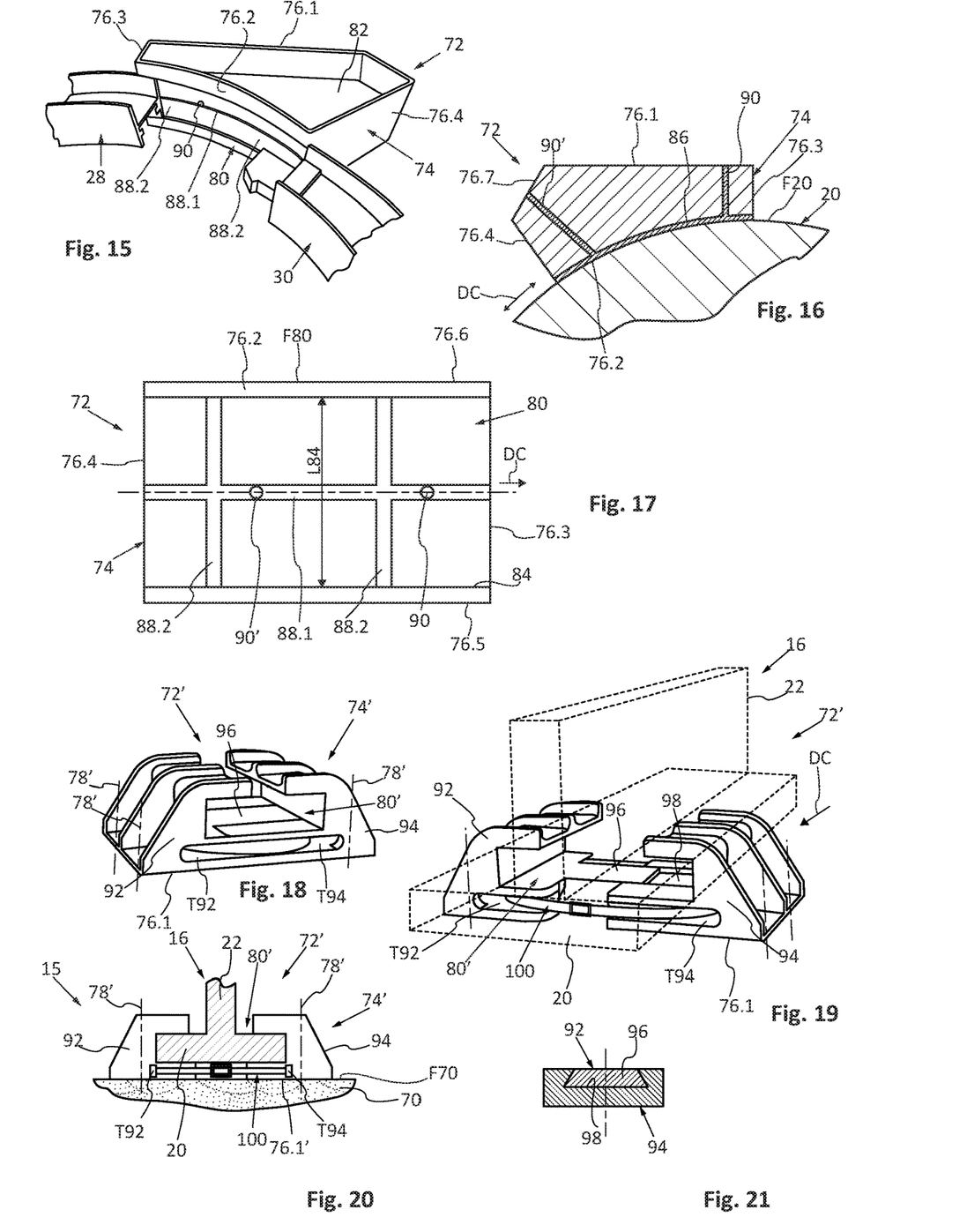
FIG. 15 is a perspective view, illustrating the assembling of the securing system visible in FIG. 13 on the retaining device.
FIG. 16 is a cross section of the securing system visible in FIG. 13 assembled on the retaining device.
FIG. 17 is a view, from beneath, of the securing system visible in FIG. 13.
FIG. 18 is a perspective view of a securing system, illustrating a second embodiment of the invention.
FIG. 19 is a perspective view of the securing system visible in FIG. 18, assembled on a retaining device depicted in chain line.
FIG. 20 is a side view of the securing system visible in FIG. 18.
FIG. 21 is a section through the securing system visible in FIG. 18.

As illustrated in FIGS. 13, 14 and 20, the pipe 10 is connected to a structure 70 by at least one securing device 15. In general, the pipe 10 is connected to the structure 70 by several securing devices 15 distributed along the length of the pipe 10.

According to one application, the structure 70 is a structure of an aircraft or an element attached to an aircraft structure. Of course, the invention is not limited to this application.

Each securing device 15 comprises at least two distinct components, namely at least one ring which encircles the pipe 10 and at least one securing system 72, 72' visible in FIGS. 11 and 13 to 21.

According to a configuration visible in FIGS. 1 to 14, the ring which encircles the pipe 10 is included in a retaining device 16 which holds insulation 12 on the pipe 10. In general, the pipe 10 comprises several retaining devices 16 intercalated between the tubes 14.

As illustrated in FIGS. 1, 3 and 4, each retaining device 16 comprises an inner ring 18, configured to fit onto the pipe 10, which has an inside diameter substantially equal to the outside diameter D10 of the pipe, an outer ring 20, coaxial with the inner ring 18, and a transverse web 22 connecting the inner and outer rings 18, 20, and approximately perpendicular to the axes of the inner and outer rings 18, 20. Each inner or outer ring 18, 20 is tubular. When the retaining device 16 is assembled on the pipe 10, the inner and outer rings 18, 20 are coaxial with the axis A10 of the pipe 10 and the transverse web 22 is positioned in a transverse plane.

According to one configuration, each inner or outer ring 18, 20 extends on each side of the transverse web 22 so that the retaining device 16 has an I-section in a longitudinal plane.

The inner and outer rings 18, 20 are spaced apart by a distance equal to the thickness E of the tube 14.

The inner and outer rings 18, 20 and the transverse web 22 form two housings 24, 24' positioned on each side of the transverse web 22, each configured to accept one end of a tube 14, the first or second end face 14.3 or 14.4 of the tube 14 being pressed firmly against or close to the transverse web 22, the inside face 14.1 and the outside face 14.2 of the tube 14 being in contact with the inner ring 18 and the outer ring 20 respectively.

The transverse web 22 may be holed in order to reduce the mass of the retaining device 16. The inner and outer rings 18, 20 and the transverse web 22 may be connected by ribs 26 in order to increase the mechanical strength of the retaining device 16.

According to one feature of the invention, the retaining device 16 is produced in two parts and comprises first and second parts 28, 30 each extending over half the circumference of the pipe 10. This configuration makes it possible to be able to assemble the retaining device 16 onto the pipe 10.

Each of the first and second parts 28, 30 respectively comprises first and second ends 28.1, 28.2, 30.1, 30.2, the first end 28.1 of the first part 28 being connected to the second end 30.2 of the second part 30 by a first connection 32, the second end 28.2 of the first part 28 being connected to the first end 30.1 of the second part 30 by a second connection 34.

According to a first alternative form illustrated in FIGS. 3 and 4, the first and second parts 28 and 30 are identical. For each first or second part 28, 30, the first end 28.1, 30.1 differs from the second end 28.2, 30.2 and complements the latter.

Figure 11:
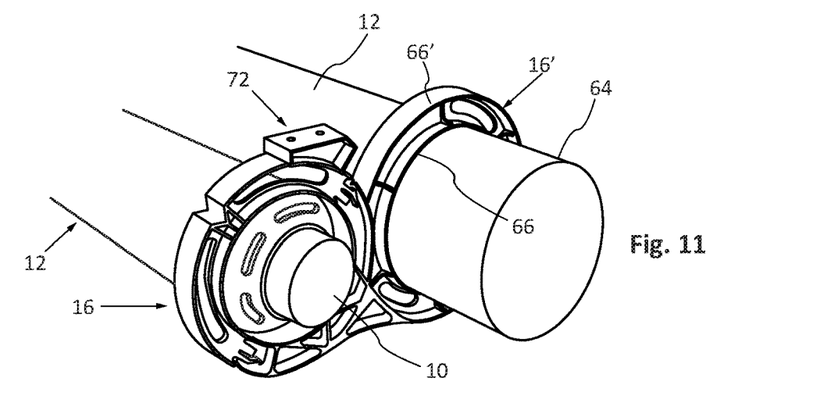
FIG. 11 is a perspective view of a first retaining device assembled on a pipe and connected to a second pipe by a second retaining device.
Figure 12:
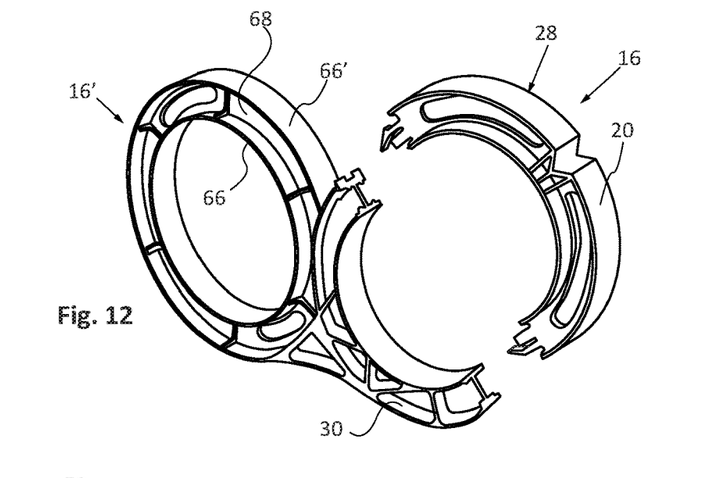
FIG. 12 is a perspective view of the first retaining device visible in FIG. 11, in the unassembled state.

According to a second alternative form illustrated in FIGS. 11 and 12, the first and second parts 28, 30 are different. For each first or second part 28, 30, the first end 28.1, 30.1 is the same as the second end 28.2, 30.2.

For both alternative forms, the first and second connections 32 and 34 are identical, can be assembled without the need for tools and are depicted in detail in FIGS. 5 to 10.

Hereinafter, only the first connection 32, that connects the first end 28.1 of the first part 28 and the second end 30.2 of the second part 30, is described. However, the first and second connections 32, 34 could be different.

Of the first and second connections 32, 34 at least one comprises at least one guide system 36 providing guidance of the first and second ends 28.1 and 30.2 with respect to one another in a direction of insertion DI and at least one locking system 38 allowing the first and second ends 28.1 and 30.2 to be immobilized in the direction of insertion DI.

The first end 28.1 comprises a first end face F28.1 positioned in a longitudinal plane. The second end 30.2 comprises a second end face F30.2 positioned in a longitudinal plane. When the first and second ends 28.1 and 30.2 are connected by the first connection 32, the first and second end faces F28.1 and F30.2 are pressed firmly against one another.

The guide system 36 comprises a tenon 40 attached to the first end 28.1, projecting with respect to the first end face F28.1 and configured to be housed in a housing 42 formed in the second end 30.2 and recessed with respect to the second end face F30.2. The tenon 40 and the housing 42 have complementing shapes so that the tenon slides in the housing 42 in the direction of insertion DI (visible in FIGS. 8 and 10).

According to one embodiment, the tenon 40 has a rectangular cross section in a plane parallel to the first end face F28.1 and has two faces F40.1, F40.2 parallel to the transverse web 22, two edge faces C40 and C40' perpendicular to the faces F40.1, F40.2, and a distal face G40 parallel to the first end face F28.1.

According to one embodiment, the two faces F40.1, F40.2 are spaced apart by a distance substantially equal to the thickness of the transverse web 22. The two edge faces C40.1, C40.2 are spaced apart by a distance less than the distance separating the inner and outer rings 18, 20.

The housing 42 is delimited by the transverse web 22 and two rails 44, 46 parallel to the transverse web 22, connected respectively to the inner ring 18 and to the outer ring 20.

Each rail 44, 46 delimits, with the transverse web 22, a groove 48, 50 which has a bottom F48, F50. Because the two rails 44, 46 are spaced apart, the transverse web 22, the rails 44, 46 and the bottoms F48, F50 of the grooves 48, 50 delimit a T-section slot.

The distance between the transverse web 22 and the rails 44, 46 is equal (to within the operating tolerance) to the distance between the faces F40.1, F40.2 of the tenon 40 and the distance between the two bottoms F48, F50 of the grooves 48, 50 is equal (to within the operating tolerance) to the distance between the edge faces C40.1, C40.2 of the tenon 40.

The rails 44, 46 extend, from the second end face F30.2, over a length substantially equal to the length of the tenon 40 (which corresponds to the distance separating the distal face G40 of the tenon 40 and the first end face F28.1).

In operation, when the tenon 40 is in its housing 42 and the first and second end faces F28.1 and F30.2 are pressed firmly against one another, the first and second ends 28.1 and 30.2 are immobile relative to one another in a longitudinal plane (parallel to the end faces F28.1 and F30.2). They can move only in the direction of insertion DI.

According to one embodiment, the first connection 32 comprises two connecting systems 36, 36' which are positioned one on each side of the transverse web 22.

Thus, the second end 30.2 comprises two housings 42, 42' which are symmetrical about the transverse web 22. The housing 42 is delimited by the transverse web 22 and two rails 44, 46. The housing 42' is delimited by the transverse web 22 and two rails 44', 46'.

The first end 28.1 comprises two tenons 40, 40' configured to become housed in the housings 42, 42' respectively.

The first tenon 40 has a rectangular cross section. The second tenon 40' has the cross section of an inverted T, the top of the T being positioned between the bottoms F48', F50' of the grooves 48', 50', and the upright of the T positioned between the rails 44', 46'.

The first and second tenons 40, 40' are separated by a slit 51 configured to house part of the transverse web 22.

The locking system 38 is configured to occupy an activated state in which it immobilizes the first and second ends 28.1 and 30.2 in the direction of insertion DI, and a deactivated state in which the first and second ends 28.1 and 30.2 can move in the direction of insertion DI.

Figure 10:
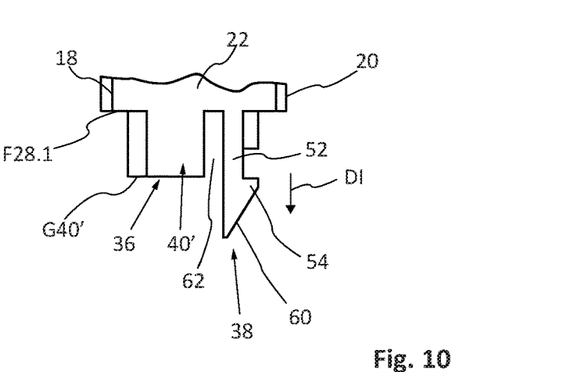
FIG. 10 is a view, from above, of the second end of the first part of the retaining device visible in FIG. 8.

As illustrated by FIG. 10, the locking system 38 comprises a tongue 52, connected to one of the first or second ends 28.1 or 30.2, which has a hooked shape 54 configured to collaborate with a catch 56 attached to the other of the first or second ends 28.1, 30.2 which offers a bearing surface parallel to the end faces.

According to one configuration, the tongue 52 is attached to the first end 28.1 and the catch 56 is attached to the second end 30.2.

The tongue 52 is elastically deformable between a state of rest in which the tongue 52 is brought close to the outer ring 20 and the hooked shape 54 is in contact with the catch 56, and an elastically deformed state in which the tongue 52 is moved away from the outer ring 20 and the hooked shape 54 is moved away from the catch 56.

The outer ring 20 comprises an orifice or a cutout 58 positioned and dimensioned to allow the passage of a tool (such as a push rod for example) that allows the tongue 52 to be pushed into the deformed state.

The tongue 52 has an inclined face 60 that allows the tongue 52 to be deformed when the parts 28 and 30 of the retaining device are being assembled.

According to one embodiment, at least one of the tenons 40, 40', in addition to performing the guiding function, acts as a locking system 38 and comprises a slit 62 which on the one hand connects the faces F40.1' and F40.2' and on the other hand connects the second end face 28.1 and the distal face G40' of the tenon 40', which is perpendicular to the transverse web 22 and to the second end face F28.1. This slit 62 allows the tongue 52 to be separated from the rest of the tenon 40' and allows it to be able to deform between the state of rest and the deformed state.

The tongue 52 has a length (dimension measured from the second end face F30.2) greater than the length of the tenon 40' so that the hooked shape 54 is positioned in the same plane as the distal face G40' of the tenon 40'.

According to a configuration visible in FIGS. 11 and 12, a first retaining device 16 assembled on a first pipe 10 is connected to a second retaining device 16' assembled on a second pipe 64.

At least one of the first and second retaining devices is produced in two parts 28, 30. According to the example illustrated in FIG. 12, the first retaining device 16 comprises first and second parts 28 and 30 which can be unassembled, the second retaining device 16' being produced as a single piece and connected to the second part 30.

According to one embodiment, the second device 16' comprises an inner ring 66 configured to fit onto the second pipe 64, an outer ring 66' and a web 68 connecting the inner and outer rings 66, 66'. The outer ring 66' of the second retaining device 16' comprises a portion in common with the outer ring 20 of the first retaining device 16.

According to another embodiment, the retaining device 16 assembled on a first pipe 10 is attached to a collar configured to fit onto a second pipe 64 so as to allow the first pipe 10 to be connected to a second pipe 64.

According to a first embodiment visible in FIGS. 11 and 13 to 17, the securing system 72 comprises a body 74 which has a first contact face 76.1, configured to be pressed firmly against and secured to a surface F70 of the structure 70 by connecting elements 78, and a groove 80 configured to allow the securing system to slide in a direction of sliding DC along the outer ring 20 of the retaining device 16.

The body 74 also comprises a second face 76.2 on which the groove 80 is positioned, third and fourth end faces 76.3, 76.4, substantially perpendicular to the direction of sliding DC, and fifth and sixth lateral faces 76.5 and 76.6, substantially parallel to the direction of sliding DC.

The body 74 may comprise at least one other face, such as for example a seventh face 76.7 which connects the first face 76.1 and the fourth end face 76.4.

According to the first embodiment, the fifth and sixth lateral faces 76.5 and 76.6 are cut away in such a way that the first, second, third and fourth faces are connected by a web 82, visible in FIG. 14, approximately in the same plane as the web 22 of the retaining device 16, parallel to the direction of sliding DC.

According to the first embodiment, the second face 76.2, the groove 80 and the direction of sliding DC are curved and have the same radius of curvature as the outer ring 20 of the retaining device 16. However, the groove 80 and the direction of sliding DC may be rectilinear, as illustrated in FIGS. 18 to 20.

The groove 80 extends from one end face 76.3 to the other end face 76.4.

According to this first embodiment, the groove 80 has a trapezoidal or dovetail cross section. Of course, the invention is not limited to this cross section. The groove 80 may have a T-shaped cross section, as illustrated in FIGS. 18 to 20. In any event, the groove 80 has a reduced mouth 84 of a width L84 smaller than the width L20 of the outer ring 20 of the retaining device 16. Whatever the embodiment, the groove 80 of the securing system 72, 72' and the outer ring 20 of the retaining device 16 have cross sections which collaborate such that when the securing system 72, 72', when it is assembled on the retaining device 16, is immobilized or near-immobilized with respect to the retaining device 16 in a plane perpendicular to the direction of sliding DC and can move with respect to the retaining device 16 in the direction of travel DC.

According to the first embodiment visible in particular in FIG. 16, the securing device comprises a bonded connection 86 connecting the securing system 72 and the retaining device 16 so as to immobilize them relative to one another in the direction of sliding DC. This bonded connection 86 is obtained using glue or any other adhesive substance.

The groove 80 comprises a bottom F80 facing the outside face F20 of the outer ring 20, the said bottom F80 comprising at least one (recessed) crevice 88.1, 88.2 configured to house the adhesive substance. According to an embodiment visible in FIG. 17, the bottom F80 of the groove 80 comprises a first crevice 88.1 running parallel to the direction of sliding DC, substantially centred with respect to the groove 80 and which extends along the entire length of the groove 80, and at least one second crevice 88.2 perpendicular to the direction of sliding DC and which extends approximately over the entire width of the groove 80.

The body 74 comprises at least one conduit 90 which has a first end opening onto the bottom F80 of the groove 80, more particularly into at least one of the crevices 88.1, 88.2, and a second end opening to outside the groove 80, and which is configured to convey the adhesive substance towards the bottom F80 of the groove 80. According to the first embodiment, the body 74 comprises two conduits 90, 90', positioned in the web 82, which open into the first crevice 88.1, the first conduit 90 opening onto the first face 76.1 and the second conduit 90' opening onto the seventh face 76.7.

Detail of the principle of operation of the securing system 72 is now given.

First of all, the retaining device 16 is in the unassembled state, the first and second parts 28, 30 being separate. The securing system 72 is positioned on at least one of the two parts 28, 30 by inserting the outer ring 20 of at least one of the two parts 28, 30 into the groove 80 from one of the third and fourth end faces 76.3, 76.4 of the body 74 of the securing system.

The retaining device 16 is positioned on a pipe 10 and assembled. The securing system is moved along the outer ring 20 of the retaining device 16 until its first contact face 76.1 is correctly firmly pressed against the surface F70 of the structure 70. This position is identified. Before the securing system 72 is secured to the structure 70, the body 74 is bonded to the outer ring 20 of the retaining device 16 by injecting glue 86 into the conduits 90, 90'. This glue flows via the crevices 88.1, 88.2 between the bottom F80 of the groove 80 and the outside surface F20 of the outer ring 20. After the glue 86 has set, the securing system 72 is attached to the structure by the fixings 78.

According to a second embodiment visible in FIGS. 18 to 21, the securing system 72' is separate from the retaining device 16 and comprises a body 74' which has a first contact face 76.1', configured to be pressed firmly against and secured to a structure 70 by connecting elements 78', and a groove 80' configured to allow the body 74' to slide along the outer ring 20 of the retaining device 16.

According to this second embodiment, the groove 80' has a T-section to accept the outer ring 20 of a retaining device 16 and part of its transverse web 22.

In order to adapt the securing system to suit different sizes of outer rings 20, the groove 80' is adjustable. To this end, the body 74' comprises a first jaw 92 and a second jaw 94 which delimit the groove 80' and which are configured to slide relative to one another in order to adjust the size of the groove 80'.

To this end, the first jaw 92 comprises an extension 96 with a trapezoidal cross section and the second jaw 94 comprises a slot 98 which has a shape that complements that of the extension 96 so that the latter slides in the slot 98 so as to be able to adjust the separation between the first and second jaws 92, 94 and thus alter the size of the groove 80.

The securing system 72' also comprises a tie 100 for connecting the jaws 92, 94 and keeping them clamped onto the outer ring 20 of the retaining device 16.

To complement the tie 100, each jaw 92, 94 comprises a through-hole T92, T94 configured to allow the tie 100 to pass through them.

The tie 100 may be a clamping collar.

The principle of operation of the securing system 72' is simple. First of all, the first and second jaws 92, 94 are parted so as to position the outer ring 20 in the groove 80'. Next, the first and second jaws 92, 94 are brought closer together to clamp the outer ring 20. The securing system 72' is moved along the outer ring 20 of the retaining device 16 until its first contact face 76.1' is correctly firmly pressed against the surface F70 of the structure 70. In this position, the tie 100 is positioned and closed up so as to keep the jaws 92, 94 clamped. If the clamping is not enough to immobilize the securing system 72' with respect to the retaining device 16, bonding may be used as in the first embodiment.

According to one method of manufacture, the retaining device and/or the securing system may be produced using additive manufacturing processes, in polyamide for example.

The invention is not restricted to the embodiments described hereinabove. Thus, a securing device 15 may comprise one or several retaining device(s) 16, 16'. In addition, it is possible for it not to comprise a retaining device but to comprise at least one simple ring 20 encircling the pipe 10, the ring 20 and the pipe being immobile or near-immobile with respect to one another in a transverse plane. Finally, it may equally comprise one or several securing systems 72, 72' configured to slide along the same ring 20 encircling the pipe.

Whatever the embodiment, the securing system 72, 72' and the ring 20 encircling the pipe 10 are two rigid elements, the securing system 72, 72' comprising at least one groove 80 configured to allow the securing system 72, 72' to slide with respect to the ring 20 in a direction of sliding DC along the ring 20. Thus, when assembled, the securing system 72, 72' and the ring 20 are immobile or near-immobile with respect to one another in a plane perpendicular to the direction of sliding DC.

In order to be able to assemble the securing system 72, 72' onto the ring 20:
- according to the first embodiment, the ring, like the retaining device, is made in two parts which are configured to be assembled with one another, and/or
- according to the second embodiment, the body 74' of the securing system 72' comprises a first jaw 92 and a second jaw 94 which delimit the groove 80' and which are configured to slide relative to one another in order to adjust the size of the groove 80'.

By virtue of the connection between the securing system 72, 72' and the ring 20 which encircles the pipe 10, the securing device 15 allows the pipe 10 to be held in a given position with respect to the structure 70 of the aircraft while at the same time making it possible to be able to firmly press the contact face 76.1, 76.1' of the securing system 72, 72' properly flat against the surface F70 of the structure 70.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for securing a pipe to a structure, comprising:
   at least one ring configured to encircle the pipe in such a way that the ring and the pipe are immobile or near-immobile relative to one another in a plane transverse to the pipe when the ring is assembled on the pipe;
   at least one securing system comprising a body having a first contact face configured to be pressed firmly against and secured to a surface of the structure; and
   a bonded connection connecting the at least one securing system and the at least one ring,
   wherein the at least one securing system and the at least one ring are distinct and rigid,
   wherein the at least one securing system comprises at least one groove in which the at least one ring is housed, said groove configured to allow the at least one securing system to slide with respect to the at least one ring in a direction of sliding along the at least one ring, the at least one securing system and the at least one ring being immobile or near-immobile relative to one another in a plane perpendicular to the direction of sliding,
   wherein the groove is positioned on a second face of the body and extends between third and fourth end faces substantially perpendicular to the direction of sliding, and
   wherein the groove and the direction of sliding are curved and have the same radius of curvature as the at least one ring.

2. The device for securing a pipe according to claim 1, wherein the groove comprises a bottom facing the outside face of the at least one ring, said bottom comprising at least one crevice to house an adhesive substance.

3. The device for securing a pipe according to claim 2, wherein the body comprises at least one conduit having a first end opening onto the bottom of the groove, and a second end opening to outside the groove, said conduit being configured to convey the adhesive substance in the bottom of the groove.

4. The device for securing a pipe according to claim 1, wherein the body comprises fifth and sixth lateral faces cut away in such a way that the first, second, third and fourth faces are connected by a web parallel to the direction of sliding.

5. The device for securing a pipe according to claim 1, wherein the at least one ring is made in two parts configured to be assembled with one another.

6. The device for securing a pipe according to claim 1, wherein the at least one securing device comprises a retaining device for holding insulation on the pipe, and comprising:
   an inner ring, configured to fit onto the pipe, the inner ring having an inside diameter substantially equal to the outside diameter of the pipe,
   an outer ring, coaxial with the inner ring, on which the at least one securing system is assembled,
   a transverse web connecting the inner and outer rings,
   the inner and outer rings and the web arranged in such a way that the retaining device has an I-section in a longitudinal plane.

* * * * *